(12) United States Patent
Hu et al.

(10) Patent No.: US 12,168,993 B1
(45) Date of Patent: Dec. 17, 2024

(54) FOLDABLE HOOK

(71) Applicant: PAPAYA INC., Thornhill (CA)

(72) Inventors: Haiyan Hu, Cixi (CN); Kaitian Shi, Cixi (CN); Rena Green, Thornhill (CA); Ehud Prisman, Thornhill (CA)

(73) Assignee: PAPAYA INC., Thornhill (CA)

( * ) Notice: Subject to any disclaimer, the term of this patent is extended or adjusted under 35 U.S.C. 154(b) by 1 day.

(21) Appl. No.: 18/206,357

(22) Filed: Jun. 6, 2023

(51) Int. Cl.
*F16B 45/00* (2006.01)

(52) U.S. Cl.
CPC ................. *F16B 45/00* (2013.01)

(58) Field of Classification Search
CPC .............. F16B 45/00; F16M 13/02
See application file for complete search history.

(56) References Cited

U.S. PATENT DOCUMENTS

| | | | |
|---|---|---|---|
| 2,842,822 A * | 7/1958 | Bennett | A47G 25/08 248/339 |
| 4,210,302 A * | 7/1980 | Serkez | F16M 13/022 248/308 |
| 8,162,276 B2 * | 4/2012 | Fathi | B67B 7/16 248/306 |
| D1,035,330 S * | 7/2024 | Prisman | D6/608 |
| 2014/0116585 A1 * | 5/2014 | Kimmel | A47G 29/083 248/339 |

* cited by examiner

*Primary Examiner* — Todd M Epps
(74) *Attorney, Agent, or Firm* — Tarolli, Sundheim, Covell & Tummino LLP

(57) ABSTRACT

A foldable hook is disclosed. The hook has a point connected to a shank and a stopper. The hook has a hollow housing with two faces separated by a sidewall, the two faces having an internal side facing the interior of the hollow housing, each of the internal sides having a rounded groove for cooperating with and allowing the stopper to rotate within the hollow housing. The sidewall having an opening, the opening for receiving the shank hook with the point outside the hollow housing and the stopper within the hollow housing. And, a channel within the hollow housing, the channel for receiving the stopper and stopping rotation of the stopper.

12 Claims, 16 Drawing Sheets

(12) United States Patent

FOLDABLE HOOK

FIELD OF THE INVENTION

The present specification relates generally to a hook, and more particularly to a foldable hook.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

Hooks are commonplace items used to support and hang objects. Hooks are in such common usage that objects which are intended to be hung from a hook when not in use, such as towels or cloths, are often provided with a hook as part of their purchase.

However, providing a hook with a relatively flat object such as a towel creates a challenge for packaging and shipping. As the hook protrudes outward from its base or support, the hook requires extra packaging and/or shipping space relative to the object on its own. Additionally, the hook is also potentially vulnerable to damage if it protrudes or otherwise creates a discontinuity in the packaging. There are also challenges with displaying the product on a shelf as a larger package requires more room to display, and uses more space.

Accordingly, there remains a need for improvements in the art to address the noted challenges.

SUMMARY OF THE INVENTION

It would be desirable to provide a hook which requires less packaging space than existing hooks, is less vulnerable to damage during shipping, and/or uses less space for displaying on a shelf.

According to an embodiment of the invention, there is provided a foldable hook, comprising: a hook with a point connected to a shank and a stopper; a hollow housing with two faces separated by a sidewall, the two faces having an internal side facing the interior of the hollow housing, each of the internal sides having a rounded groove for cooperating with and allowing the stopper to rotate within the hollow housing; the sidewall having an opening, the opening for receiving the shank of the hook with the point outside the hollow housing and the stopper within the hollow housing; and a channel within the hollow housing, the channel for receiving the stopper and stopping rotation of the stopper.

The embodiment may further comprise that the hook may be moveable between a first shipping position, wherein the stopper is rotated such that the hook is substantially parallel with the faces for a low profile and a second usage position, wherein the stopper is rotated such that the hook is substantially perpendicular with the faces, and the stopper is received in the channel.

In an embodiment, the channel and the groove are in-line with the opening. The channel may comprise two parallel sides extending from the sidewall and/or a face, and proximate the opening.

In an embodiment, the stopper turns within the hollow housing without pressing on and/or putting any pressure on the internal side of each of the two faces. In another embodiment, the stopper turns within the hollow housing and minimizes pressure on the internal side of each of the two faces.

In an embodiment, the stopper prevents the hook from separating from the hollow housing. The hollow housing may comprise an upper housing and a lower housing. In a further embodiment, the hollow housing is a cylinder. In a still further embodiment, the stopper is a cube.

In a still further embodiment, an adhesive may be applied to the outer side of one of the faces for attaching the hook to a surface.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which.

Like reference numerals indicated like or corresponding elements in the drawings.

DETAILED DESCRIPTION OF THE EMBODIMENTS

The present invention relates generally to a hook, and more particularly to a foldable hook, preferably for use in minimizing the size of packaging for a product containing the foldable hook such that shipping the product, and/or displaying the product requires less space.

Figure 1:
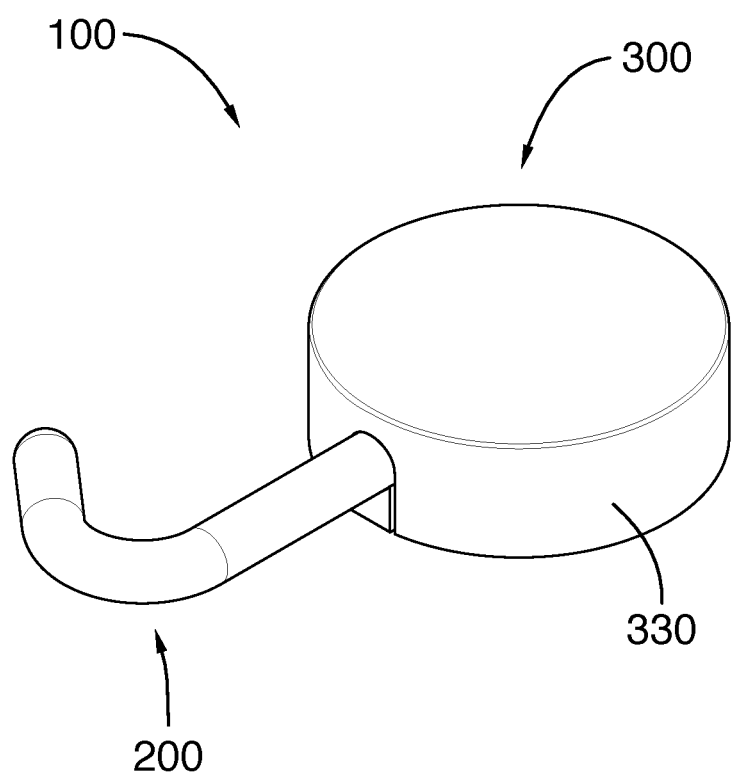
FIG. 1 is a perspective view of a foldable hook in a shipping position according to an embodiment.
Figure 10:
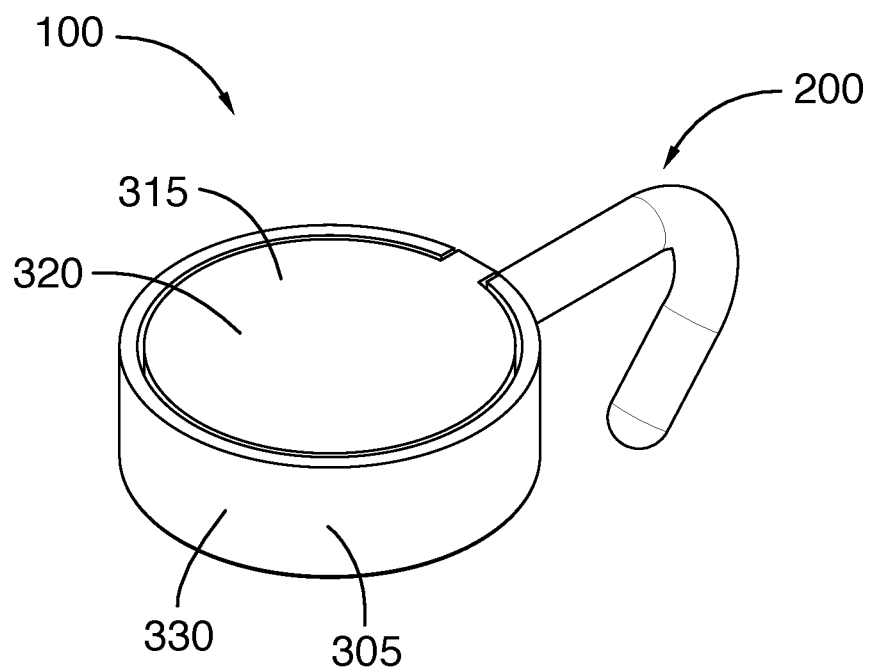
FIG. 10 is a bottom perspective view of FIG. 3.

As shown in the embodiment of FIG. 1, the foldable hook 100 is formed from a hook 200 and a hollow housing 300. The hook 200 is rotatably movable from a first position (shipping position) with the hook 200 parallel to the hollow housing 300 and a second position (usage position) with the hook 200 perpendicular to the hollow housing 300. A bottom perspective is shown in FIG. 10. In an embodiment, the outer side of face 320 may have an adhesive (e.g. glue, tape, double sided tape, etc.) attached for attaching the foldable hook to a surface.

Figure 2:
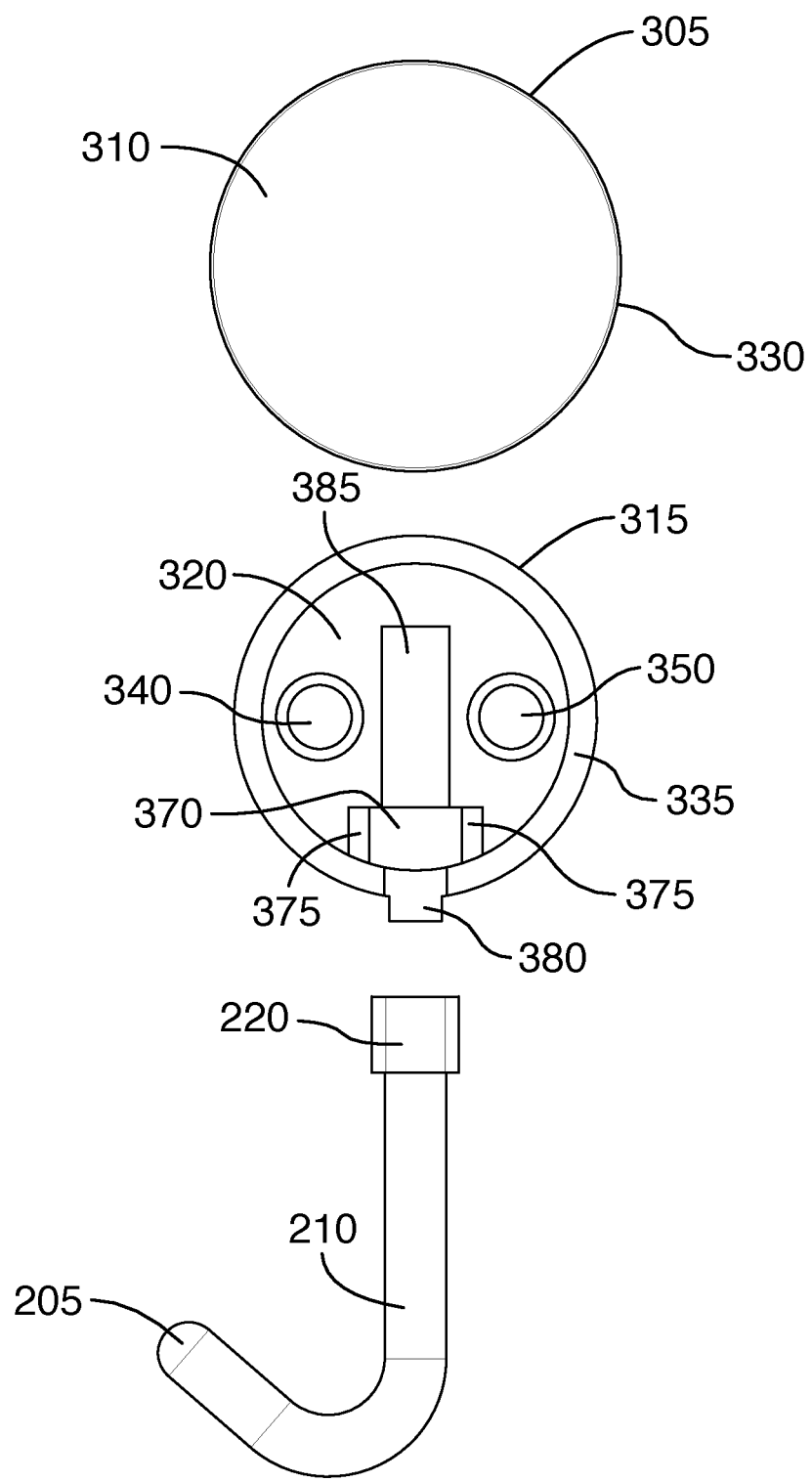
FIG. 2 is an exploded view of FIG. 1.
Figure 3:
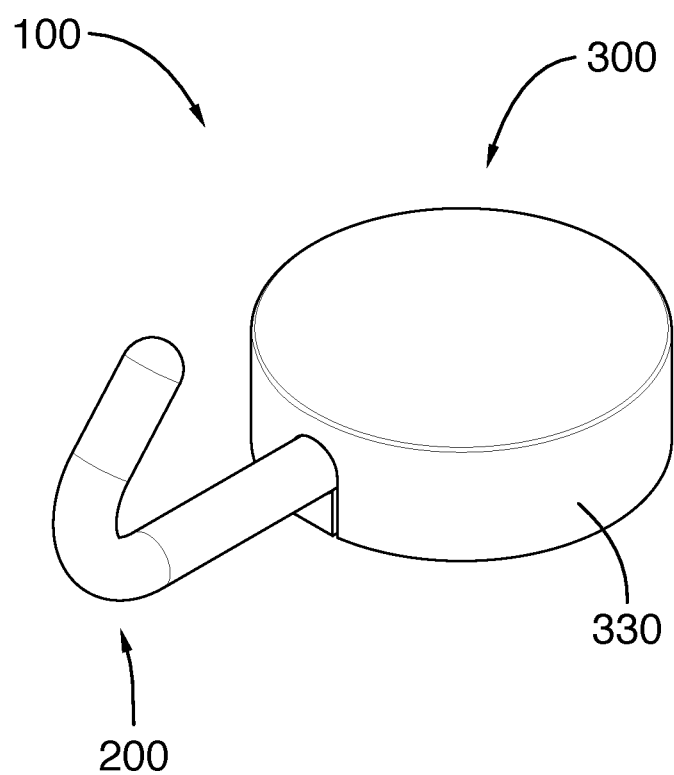
FIG. 3 is a perspective view of a foldable hook in a usage position according to an embodiment.
Figure 4:
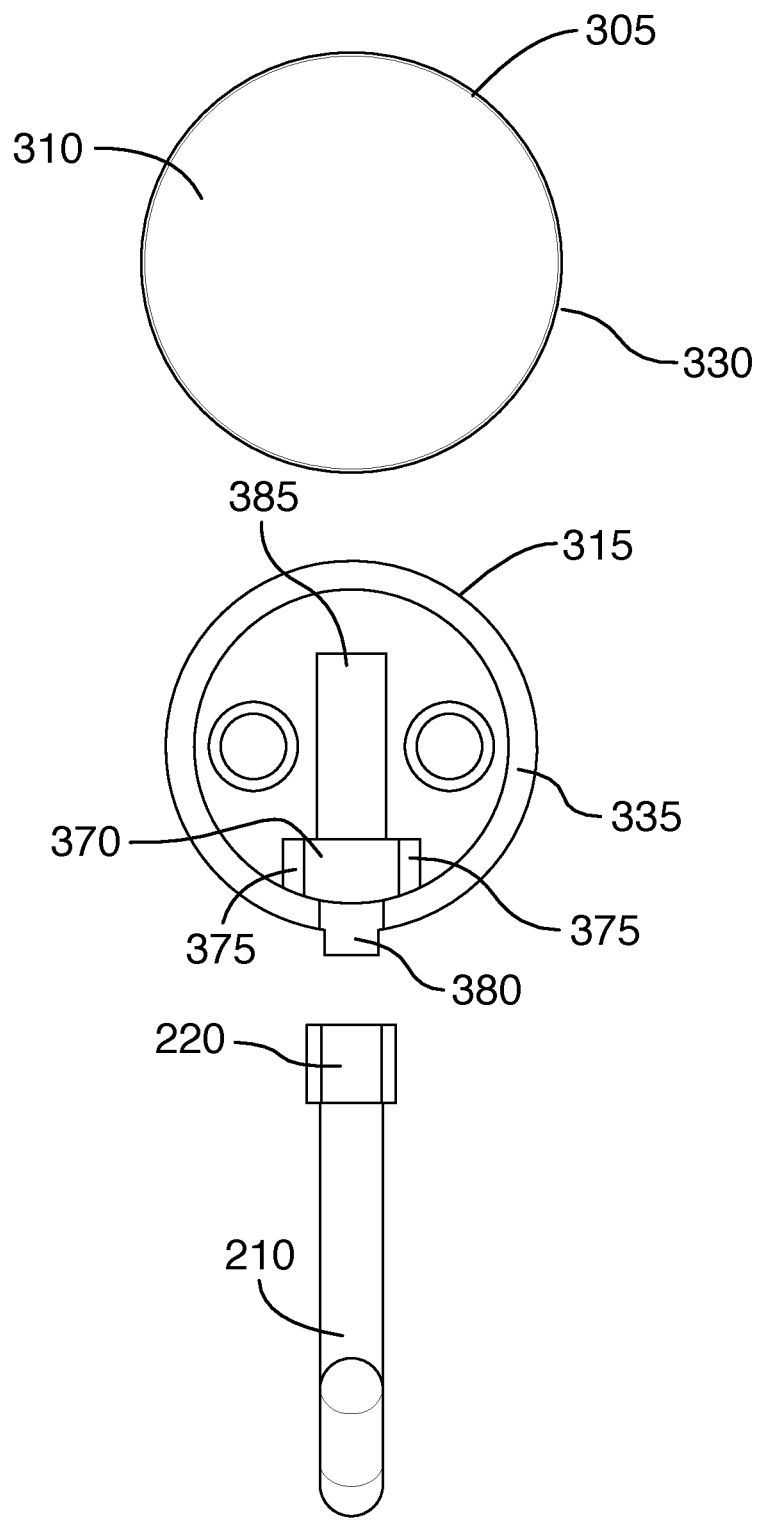
FIG. 4 is an exploded view of FIG. 3.
Figure 11:
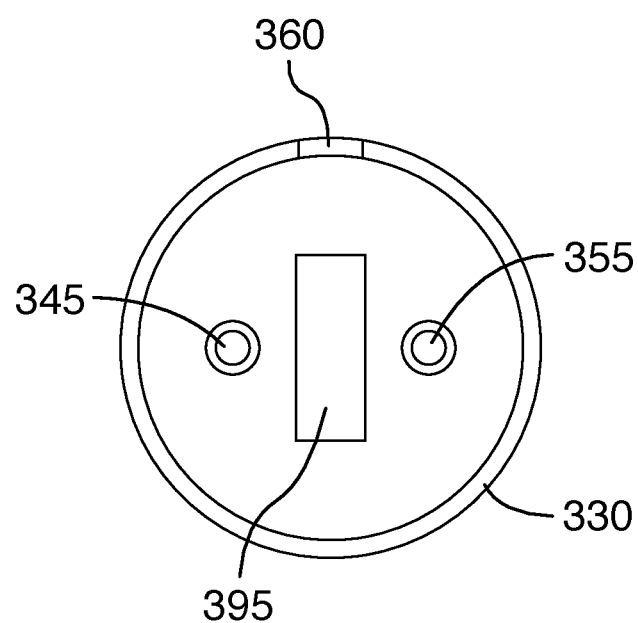
FIG. 11 is a bottom view of an embodiment of the upper housing.
Figure 12:
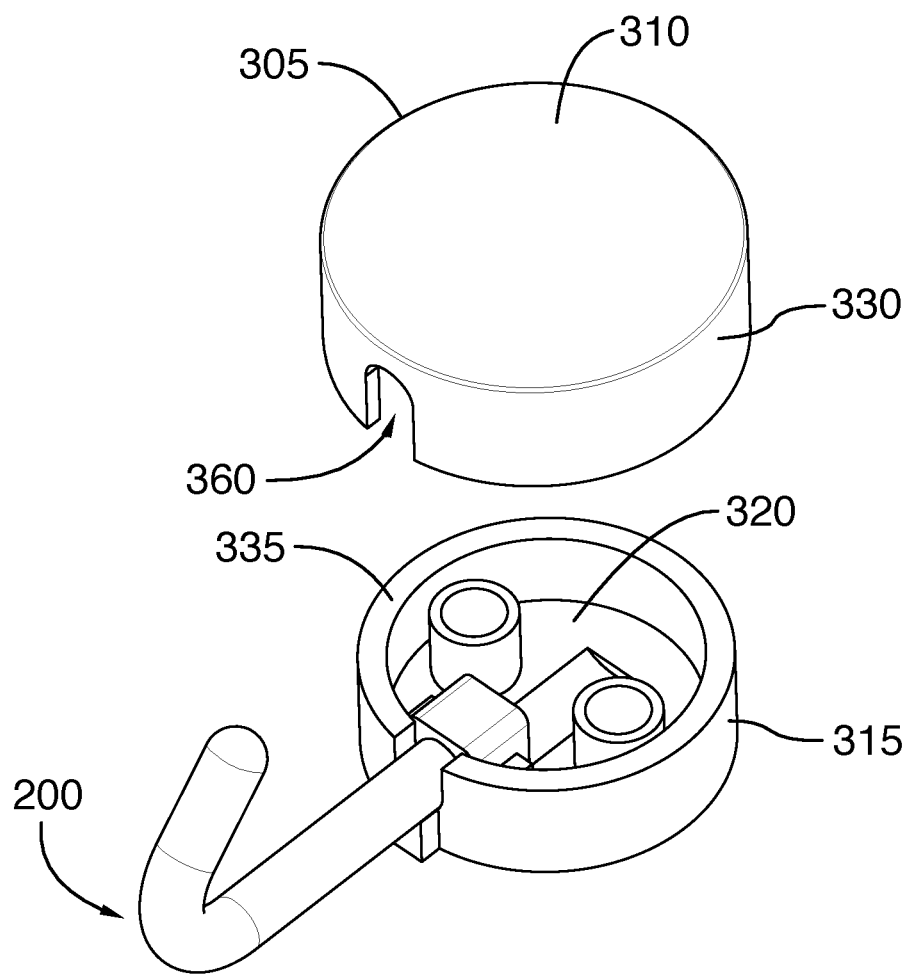
FIG. 12 is an exploded perspective view of FIG. 1.

As shown in detail in FIGS. 2, 11, and 12, the hollow housing 300 has two faces 310, 320 separated and spaced apart by a sidewall 330. As shown, the hollow housing is cylindrical in shape, however, other shapes may be contemplated and used as a matter of design choice. Supports 340, 350 and 345, 355 may be placed within the interior of hollow housing 300 to help maintain the separation of the two faces 310, 320.

In an embodiment, the hollow housing has an upper housing 305 with face 310 and sidewall 330, and a lower housing 315 with face 320 and inner sidewall 335. The upper housing 305 and lower housing 315 may be attached by friction fit of the sidewalls 330 and 335. The upper housing 305 and lower housing 315 may be attached by supports 340 and 350 with matching supports 345 and 355. Or, the upper housing 305 and lower housing 315 may be attached by both friction fit of the sidewalls and the supports.

The sidewall 330 includes an opening 360 allowing hook 200 to pass through sidewall 330. A channel 370 is formed by side walls 375 in one face (e.g. 320) to receive the stopper 220. Each face 310, 320 may further include a groove 385, 395 to facilitate rotation of the hook 200 without applying pressure to the inner side of faces 310, 320.

Hook 200 is formed from a shank 210, which curves into the hook shape, with a point 205 and a stopper 220 dimensioned larger than shank 210. As shown, shank 210 is circular in cross-section and generally cylindrical in shape, whereas stopper 220 is square in cross-section and normally cubic in shape. The dimensions of stopper 220 are such that hook 200 is capable of rotation within hollow housing 300 without applying pressure to faces 310, 320 when the stopper 220 cooperates with the groove 385 and 395. The dimensions of stopper 220 are further such that when stopper 220 is positioned within channel 370, hook 200 is not capable of rotation as stopper 220 is engaged within channel 370. Stopper 220 is further dimensioned larger than opening 360 to prevent hook 200 from falling out or otherwise being removed.

In an embodiment, face 320 may further include a protrusion 380 adjacent to opening 360. Protrusion 380 acts to guide the rotation of hook 200 and provide support when hook 200 is in the usage position. Protrusion 380 may cooperate with opening 360 to guide the rotation of the shank 210 of the hook 200.

Figure 5A:
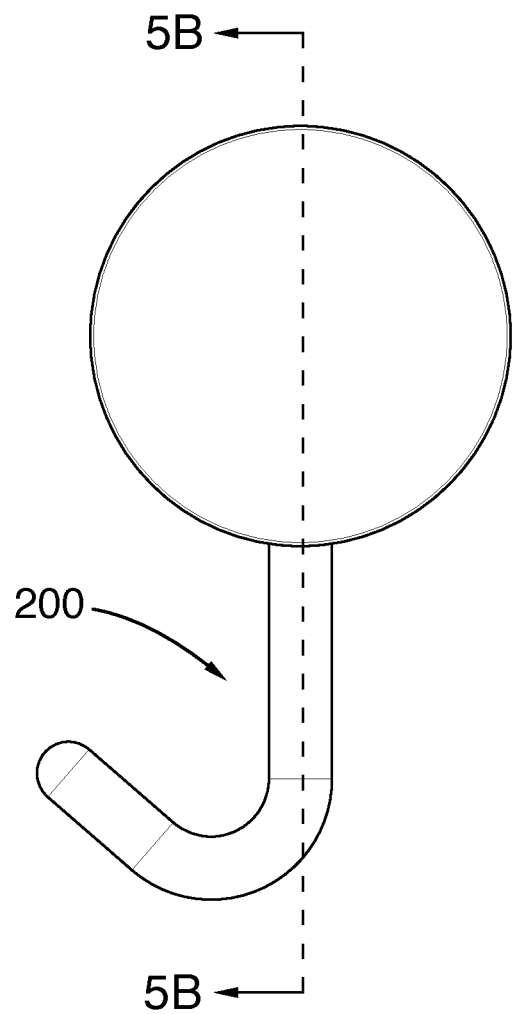
FIG. 5A is a top view of FIGS. 1 and 5B is a sectional view along the line 5B.
Figure 5B:
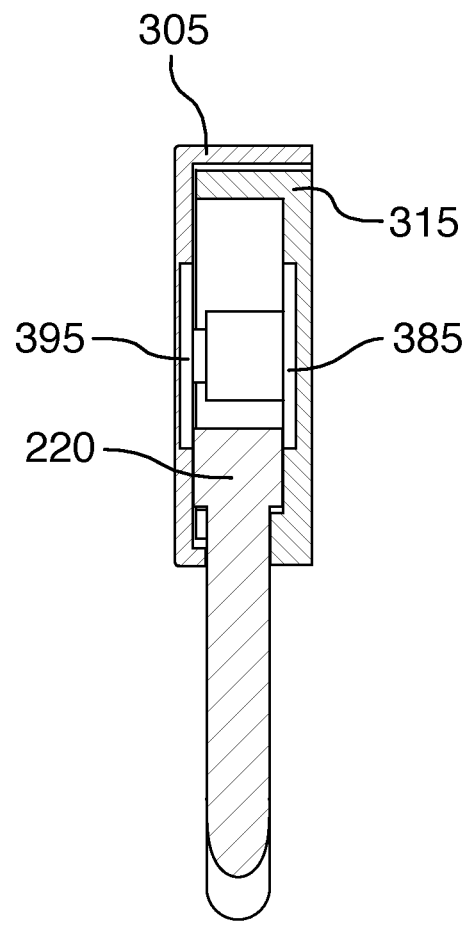
Figure 6A:
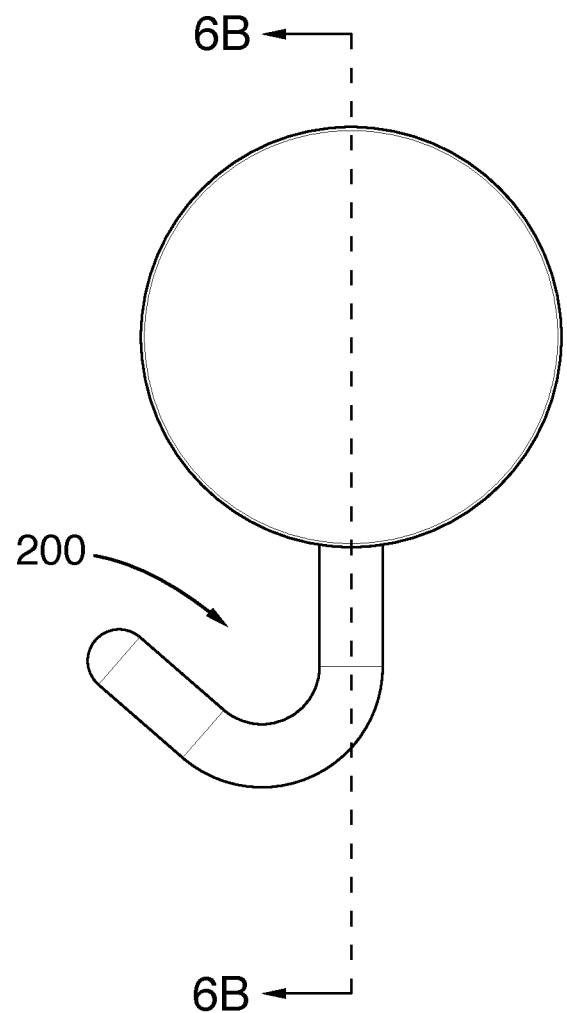
FIG. 6A is a top view of the foldable hook in the shipping position and partially retracted, 6B is a sectional view along the line 6B, and 6C is detailed view perpendicular to 6B.
Figure 6B:
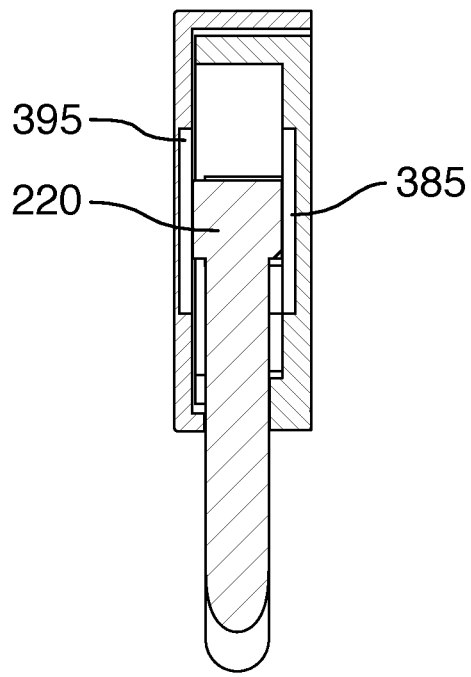
Figure 6C:
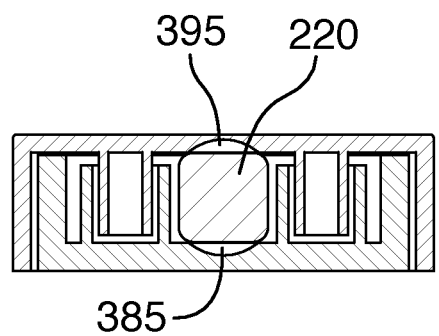
Figure 7A:
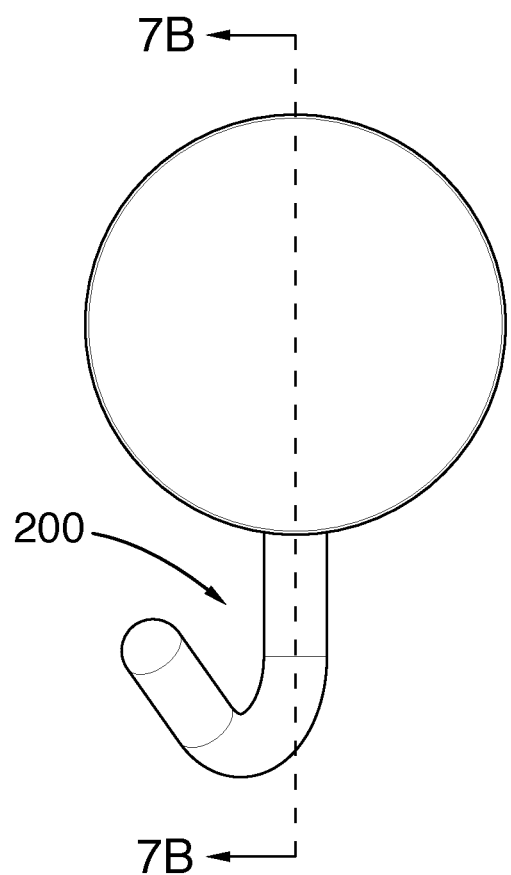
FIG. 7A is a top view of the foldable hook in an intermediate position, 7B is a sectional view along the line 7B of the foldable hook at a 45 degree angle, and 7C is a detailed view perpendicular to 7B.
Figure 7B:
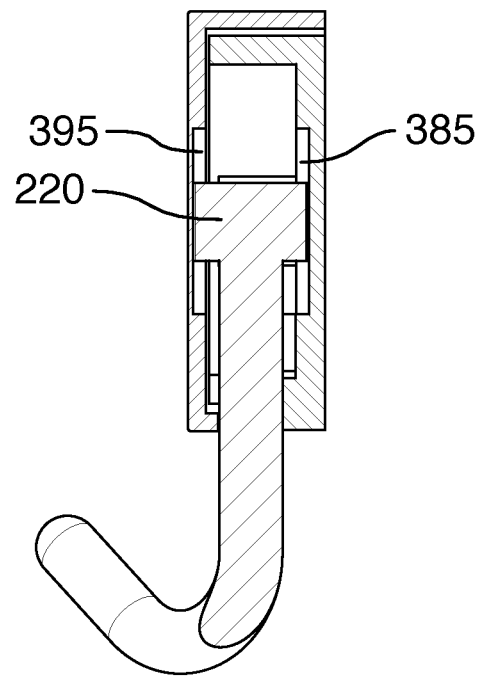
Figure 7C:
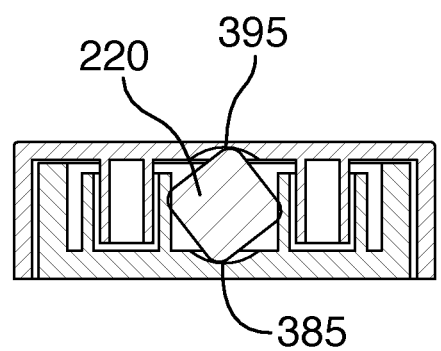
Figure 8A:
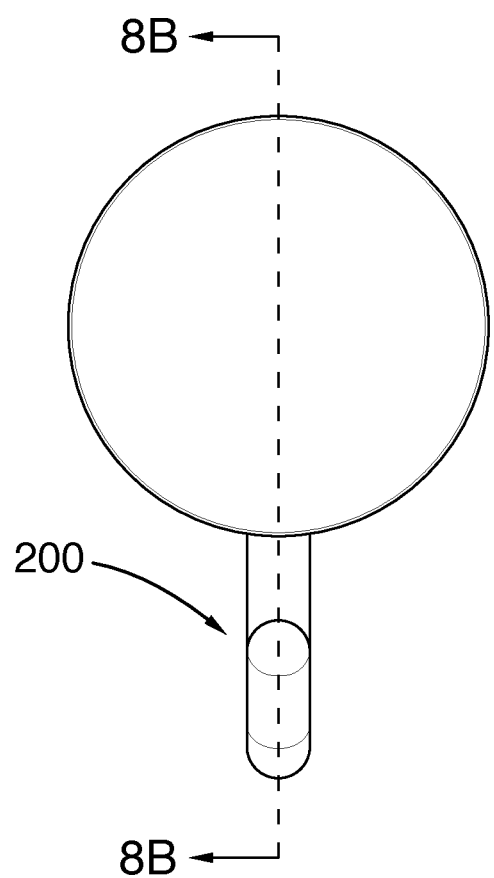
FIG. 8A is a top view of the foldable hook in the usage position and partially retracted, and 8B is a sectional view along the line 8B.
Figure 8B:
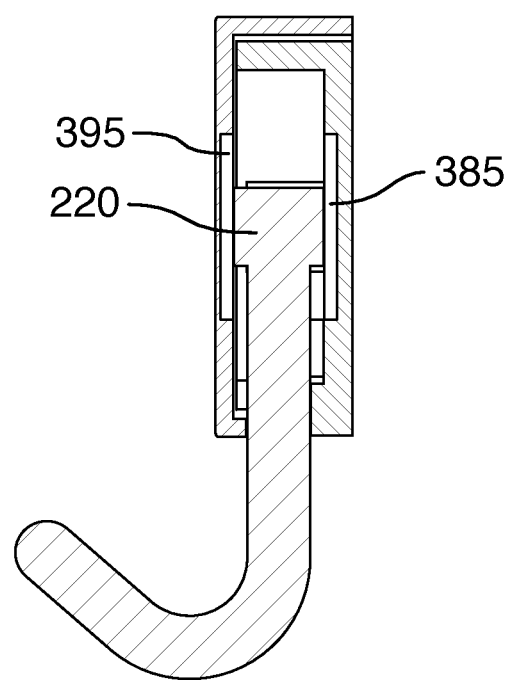

In operation, hook 200 begins in the shipping position as shown in FIGS. 5A and 5B. In this position, hook 200 is positioned between the two faces 310, 320 such that the overall thickness is determined by the thickness of hollow housing 300. The thickness of housing 300 is about the height of the sidewall 330. Accordingly, the space required for foldable hook 100 is reduced relative to the usage position.

Figure 9A:
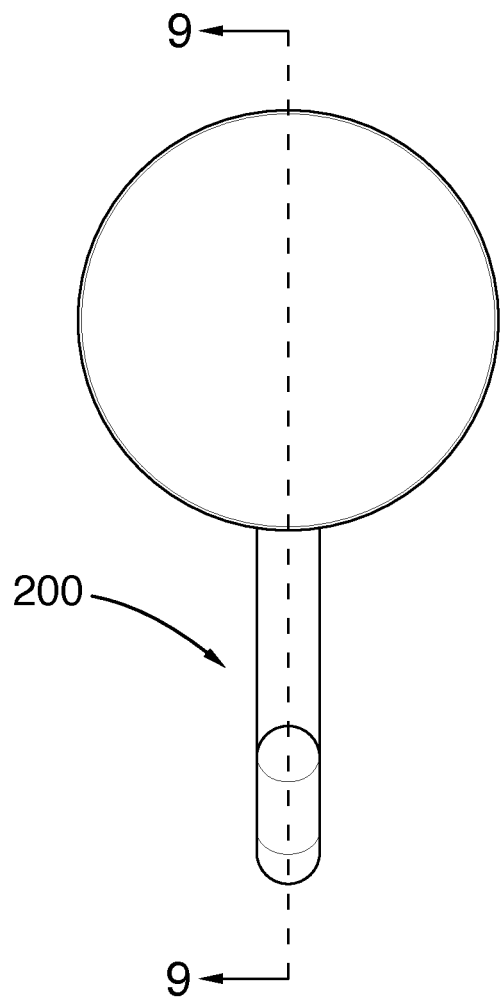
FIG. 9A is a top view of the foldable hook in the usage position, and 9B is a sectional view along the line 9.
Figure 9B:
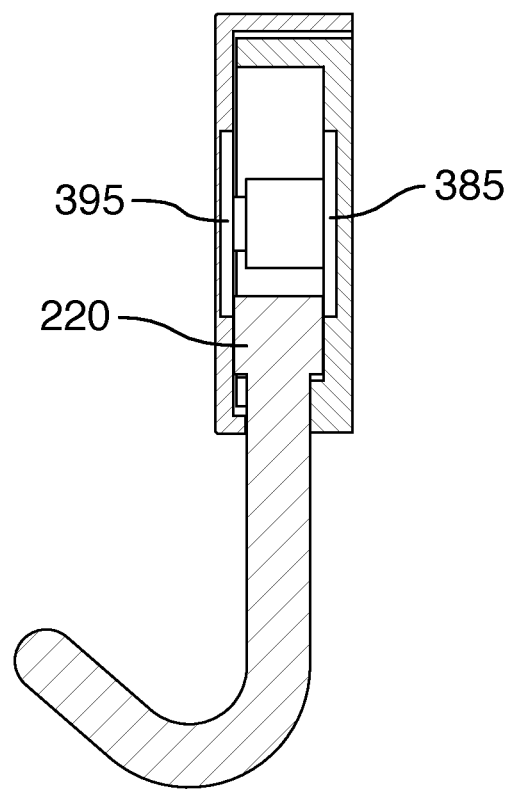

For use, hook 200 is then rotated into the usage position, and extended downward such that stopper 220 is engaged in channel 370. Hook 200 is then secured in the usage position as shown in FIGS. 9A and 9B, with hook 200 extending outward relative to faces 310, 320. As shown in FIG. 12, stopper 220 is dimensioned and shaped to fit within channel 370 without rotating when hook 200 is in the usage position. Also, when the stopper 220 is within the channel 370, the friction fit reduces and/or prevents the stopper 220 from leaving the channel 370 (i.e. the hook stays in the usage position and does not easily slide out of the usage position). A skilled person would understand that if the stopper 220 easily left the channel 370 then the foldable hook would not be a dependable hook in the usage position.

FIGS. 5A to 9B show the foldable hook changing from the shipping position to the usage position. The shipping position may be either of the positions of the foldable hook shown in 5A, 5B and 6A, 6B. FIG. 5A shows the hook 200 locked in the shipping position, i.e. the stopper 220 is in the channel 270. FIGS. 6A and 6B show the hook 200 in the shipping position and partially retracted, and in this position the hook 200 may rotate. FIG. 6C shows a detail of the stopper 220 and that 2 sides are parallel to the faces 310 and 320. FIG. 7A shows the hook at about a 45 degree rotation, with the hook between the shipping position and the usage position. FIGS. 7B and 7C show the detail 2 of the corners of the stopper 220 interacting with the grooves 385, 395 so that the hook 200 and stopper 220 can rotate within the housing 300 without pressing and/or minimizing pressure on the inner side of the faces 310 and 320. A skilled person would understand that the diagonal of the stopper 220 (a cube in this embodiment) is longer then the sides and would put pressure and/or press on the inner side of the faces 310 and 320 without the grooves 385, 395. FIGS. 8A and 8B show the foldable hook in the usage position and partially retracted. FIGS. 9A, and 9B show the foldable hook locked in the usage position with the stopper 220 in the channel 370.

Also, if the stopper 220 was round in shape (e.g. a cylinder, a sphere) then the stopper 220 when received in channel 370 may not prevent the hook 200 from turning, even though the round grooves are not required to turn the stopper 220 without pressing on the inner sides of faces 310 and 320 within the housing 300.

Generally, it is expected that foldable hook 100 is mounted such that hook 200 extends downwards and is thus maintained in place by the help of the force of gravity, and the friction fit of the stopper 220 with the channel 370 as shown in FIG. 12.

It should also be noted that the steps described in the method of use can be carried out in many different orders according to user preference. The use of "step of" should not be interpreted as "step for", in the claims herein and is not intended to invoke the provisions of 35 U.S.C. § 112 (f). It should also be noted that, under appropriate circumstances, considering such issues as design preference, user preferences, marketing preferences, cost, structural requirements, available materials, technological advances, etc., other methods are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the Patent and Trademark Office and the public generally, and especially the scientist, engineers and practitioners in the art who are not familiar with patent or legal terms or phraseology, to determine quickly from a cursory inspection the nature and essence of the technical disclosure of the application.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A foldable hook, comprising:
   a hook with a point connected to a shank and a stopper;
   a hollow housing with two faces separated by a sidewall, the two faces having an internal side facing the interior of the hollow housing, each of the internal sides having a rounded groove for cooperating with and allowing the stopper to rotate within the hollow housing;
   the sidewall having an opening, the opening for receiving the shank of the hook with the point outside the hollow housing and the stopper within the hollow housing; and
   a channel within the hollow housing, the channel for receiving the stopper and stopping rotation of the stopper.

2. The foldable hook of claim 1, wherein, in a first, shipping position, the stopper is rotated such that the hook is substantially parallel with the faces for a low profile.

3. The foldable hook of claim 2, wherein, in a second, usage position, the stopper is rotated such that the hook is substantially perpendicular with the faces, and the stopper is received in the channel.

4. The foldable hook of claim 1, wherein the channel and the groove are in-line with the opening.

5. The foldable hook of claim 1, the channel comprising two parallel sides extending from the sidewall and/or a face, and proximate the opening.

6. The foldable hook of claim 1, wherein the stopper turns within the hollow housing without pressing on and/or putting any pressure on the internal side of each of the two faces.

7. The foldable hook of claim 1, wherein the stopper turns within the hollow housing and minimizes pressure on the internal side of each of the two faces.

8. The foldable hook of claim 1, wherein the stopper prevents the hook from separating from the hollow housing.

9. The foldable hook of claim 1, wherein the hollow housing comprises an upper housing and a lower housing.

10. The foldable hook of claim 1, wherein the hollow housing is a cylinder.

11. The foldable hook of claim 1, wherein the stopper is a cube.

12. The foldable hook of claim 1, wherein an adhesive is applied to the outer side of face 320 for attaching the hook to a surface.

* * * * *